(12) United States Patent
Schulz

(10) Patent No.: US 7,610,876 B1
(45) Date of Patent: Nov. 3, 2009

(54) ERGONOMIC BIRD FEEDER AND ASSEMBLY METHOD

(76) Inventor: Raymond Charles Schulz, 4912 Sunset Oaks La., Saint Louis, MO (US) 63126-5826

( * ) Notice: Subject to any disclaimer, the term of this patent is extended or adjusted under 35 U.S.C. 154(b) by 0 days.

(21) Appl. No.: 12/134,901

(22) Filed: Jun. 6, 2008

(51) Int. Cl.
 *A01K 39/00* (2006.01)
(52) U.S. Cl. ....................................... 119/57.8
(58) Field of Classification Search .............. 119/57.8, 119/52.2, 52.3, 57.9, 429, 430
 See application file for complete search history.

(56) References Cited

U.S. PATENT DOCUMENTS

| | | | | |
|---|---|---|---|---|
| 3,568,641 | A * | 3/1971 | Kilham | 119/57.8 |
| 4,188,913 | A * | 2/1980 | Earl et al. | 119/57.9 |
| 4,327,669 | A * | 5/1982 | Blasbalg | 119/57.8 |
| 4,829,934 | A * | 5/1989 | Blasbalg | 119/57.8 |
| 5,215,039 | A * | 6/1993 | Bescherer | 119/57.8 |
| 5,435,268 | A * | 7/1995 | Liethen | 119/57.8 |
| D367,134 | S * | 2/1996 | Bescherer | D30/127 |
| 5,671,696 | A * | 9/1997 | Liethen | 119/57.8 |
| 5,791,286 | A | 8/1998 | Taussig et al. | |
| 5,937,788 | A * | 8/1999 | Boyd | 119/57.9 |
| 6,213,054 | B1 * | 4/2001 | Marshall | 119/57.8 |
| 6,253,707 | B1 | 7/2001 | Cote | |
| 6,662,746 | B2 | 12/2003 | Laske, Jr. | |
| 7,191,731 | B2 | 3/2007 | Cote | |
| 7,194,977 | B2 | 3/2007 | Nock | |
| 7,261,055 | B2 | 8/2007 | Nock | |
| 7,261,056 | B2 * | 8/2007 | Hunter et al. | 119/57.8 |
| 7,287,486 | B2 * | 10/2007 | Hunter | 119/57.8 |
| 7,302,911 | B1 | 12/2007 | Lush | |
| 7,469,656 | B2 * | 12/2008 | Hunter et al. | 119/57.8 |
| 2003/0019436 | A1 | 1/2003 | Nicholas | |
| 2006/0180088 | A1 | 8/2006 | Nock | |
| 2006/0266296 | A1 | 11/2006 | Nock | |
| 2007/0034160 | A1 | 2/2007 | Nock | |
| 2007/0266950 | A1 * | 11/2007 | Walsh | 119/57.8 |

\* cited by examiner

*Primary Examiner*—Yvonne R. Abbott

(57) ABSTRACT

A hollow tube type bird feeder configured with at least one ergonomically dimensioned feeder station. The feeder station includes a circumferentially keyed circular feeder portal/circumferentially keyed circular perch portal pair for engaging and coupling with a mating keyed feeder portal insert and a mating keyed perch portal insert. The tube has an open top end with external threads and an open bottom end with external threads. The feeder also includes an internally threaded cover cap for rotationally engaging and securing the open top portion of the feeder tube and an internally threaded base for rotationally engaging and securing the bottom portion of the feeder tube. Feeder components are constructed from recyclable materials and easily cleaned; and the feeder can be easily assembled or disassembled without tools.

17 Claims, 5 Drawing Sheets

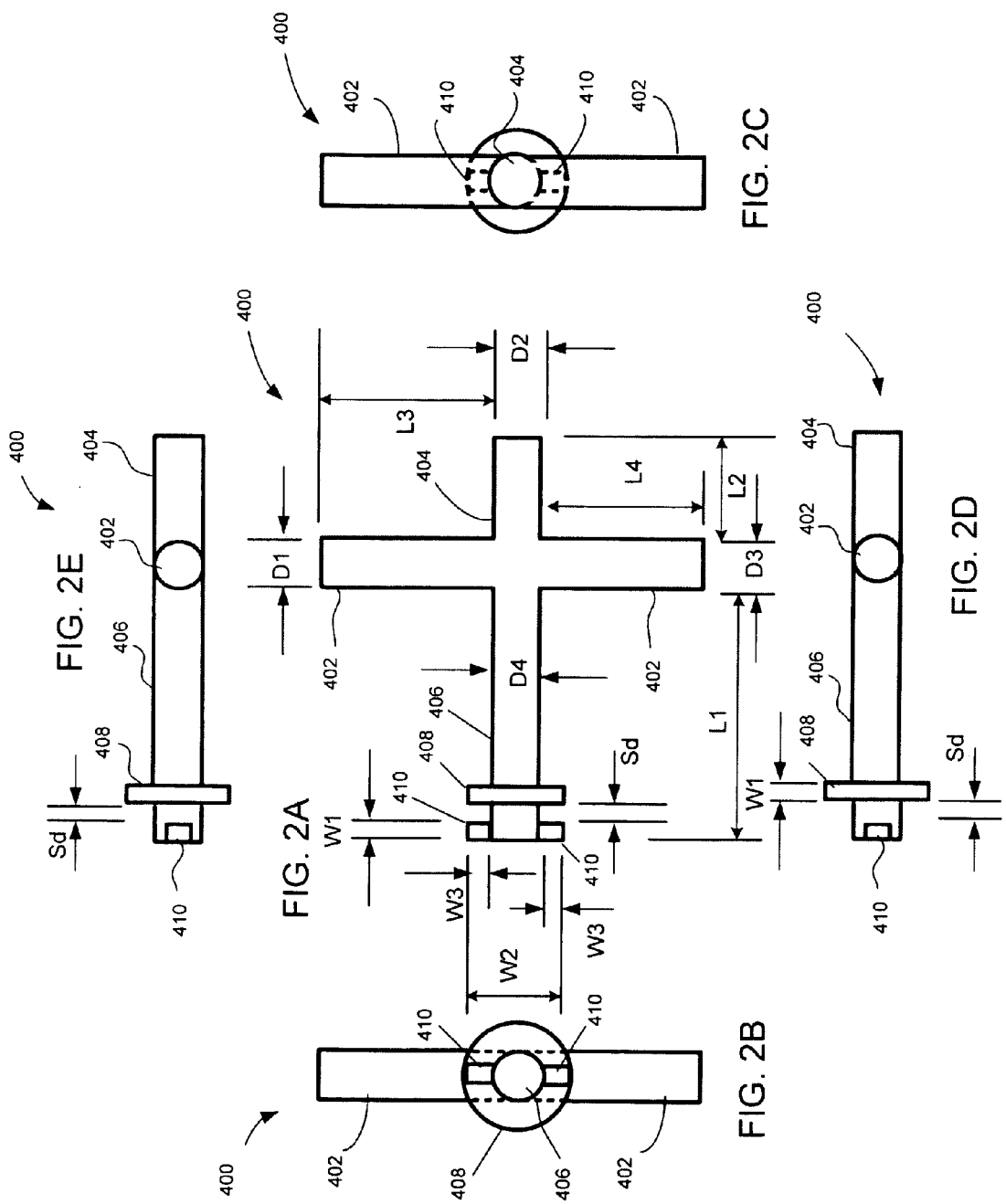

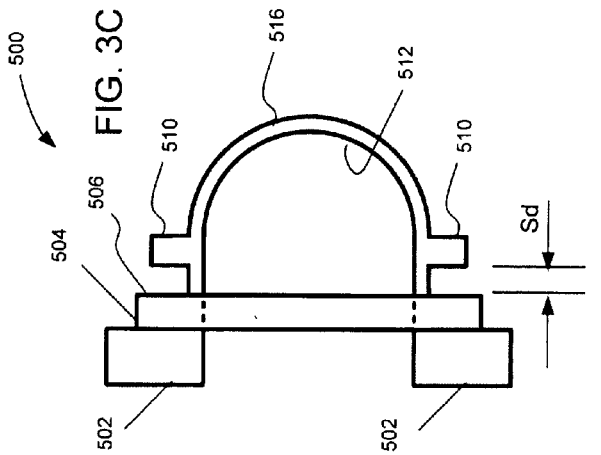
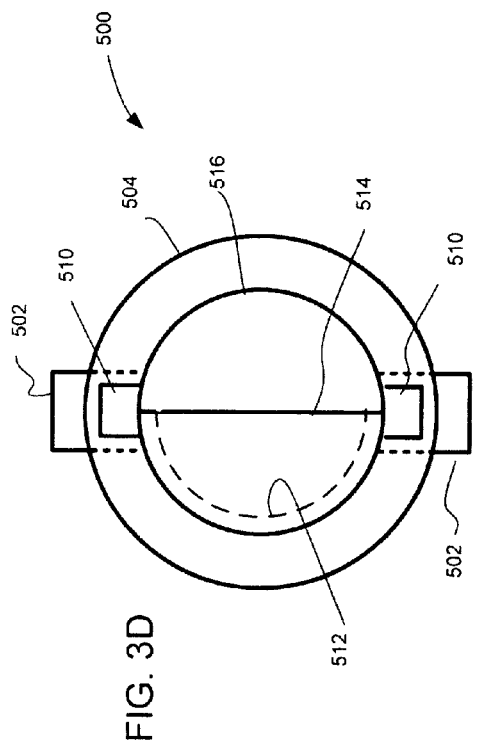
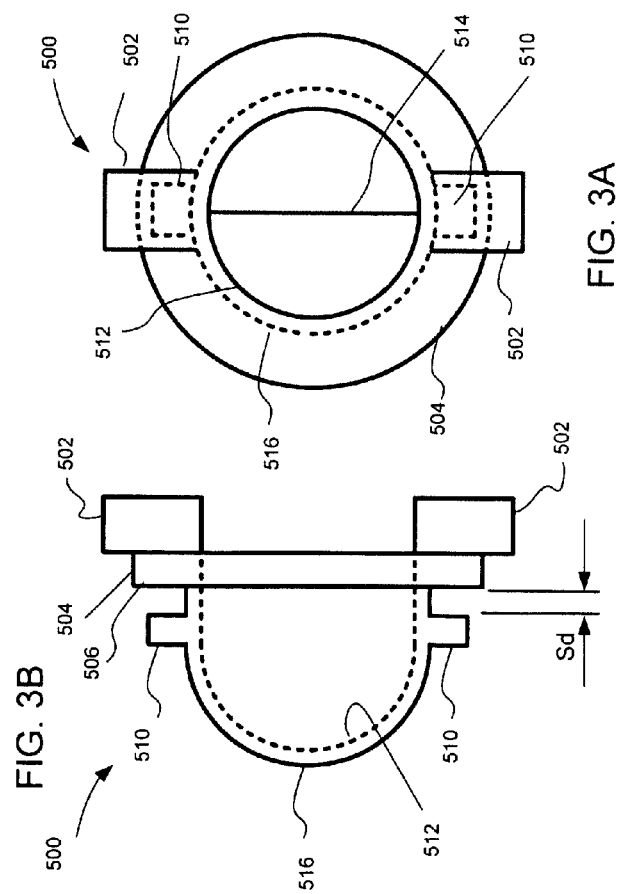

ERGONOMIC BIRD FEEDER AND ASSEMBLY METHOD

FIELD

The present disclosure relates generally to a bird feeder and more particularly to a hollow cylindrical tube-type bird feeder configured with at least one ergonomically configured feeder station to facilitate access to feed. The feeder and its component parts are configured for ease of assembly/disassembly without tools and for ease of cleaning

BACKGROUND

The statements in this section merely provide background information related to the present disclosure and may not constitute prior art.

Current tubular-type bird feeders comprise components that require tools to assemble and disassemble the feeder for cleaning and/or for parts replacement. Parts may be difficult to clean. Feeders are often dimensioned with standard-sized feeding stations, each station having a perch portal and feeding portal that do not readily accommodate the various physical sizes of birds seeking to access feed from the feeder.

Considerable size variation exists among birds that may visit a feeder, such as finches (13-14 cm), Northern Cardinals (19-23 cm), Chickadees (12-14 cm), Tufted Titmouse (15 cm), Nuthatches (11-15 cm), Blue Birds (18 cm), Wrens (10-14 cm), Blue Jays (28-31 cm) and Woodpeckers (21-35 cm) etc. A feeder that can accommodate birds of varying sizes will likely attract a greater variety of birds to the feeder. Alternatively, an ergonomically designed feeder can have feeder stations dimensioned to attract specific sizes of birds, for example, a feeder with feeder stations dimensioned to attract the Northern Cardinal. What is needed is a bird feeder that can be easily assembled and disassembled without tools, can easily be cleaned and ergonomically attracts desired bird species to the feeder. Feeder embodiments disclosed herein achieve these objectives.

SUMMARY

In a first embodiment, an ergonomic bird feeder is configured with at least one feeder station, said feeder station comprising a circumferentially keyed circular feeder portal and a paired circumferentially keyed circular perch portal. The ergonomic bird feeder includes an elongated hollow cylindrical feeder tube having an open top end with external threads and an open bottom end with external threads; a circular cover cap with internal threads configured for rotationally engaging the external threads of said top end and enclosing said top of said feeder tube, said cover cap configured for engaging hanging hardware; a circular base with internal threads configured for rotationally engaging said external threads of said bottom and enclosing the bottom of said feeder tube; at least one keyed feeder portal insert for inserting into and mating with said keyed feeder portal, frictionally engaging the internal and external wall surfaces of said feeder tube upon rotation of the feeder portal insert relative to the feeder portal; and at least one keyed perch portal insert for inserting into and mating with said keyed perch portal, frictionally engaging the internal and external wall surfaces of said feeder tube upon rotation of the perch portal insert relative to the perch portal.

Configured with a plurality of feeder stations, a first ergonomic feeder embodiment can have a substantially similar ergonomically configured vertical distance between a center of a circular feeder portal and a center of a circular perch portal, their respective portal centers having a common vertical centerline. In such embodiment, the feeder tube and said feeder stations can be configured for birds having the same approximate physical size and attract similarly sized bird species to the feeder.

In a second embodiment, comprising a plurality of feeder stations, each feeder station of the feeder tube can be ergonomically configured with a different vertical dimension between the center of a circular feeder portal and a center of its paired circular perch portal. Such embodiment can attract different sized birds to the same feeder.

In an alternative ergonomic feeder embodiment, vertical centerlines of a circular feeder portal and a circular perch portal of a feeder station can be configured with a horizontal offset. In such embodiment, a vertical separation distance between a center of a circular feeder portal and a circular pedestal portal can be the same or can be dimensioned differently for each feeder station.

In disclosed ergonomic bird feeder embodiments, bird feeder components made from recyclable materials are configured for ease of assembly and disassembly without tools and for ease of cleaning; and each feeder station is comprised of an ergonomically configured circumferentially keyed circular feeder portal and a circumferentially keyed circular perch portal pair.

Further areas of applicability will become apparent from the description provided herein. It should be understood that the description and specific examples disclosed are intended for purposes of illustration only and are not intended to limit the scope of the present disclosure.

DRAWINGS

The drawings described herein are for illustration purposes only and are not intended to limit the scope of the present disclosure in any way.

FIGS. 2A-2E are top, left side, right side, front and rear views of a cross-shaped perch portal insert component with a keyed base of an ergonomic bird feeder;

FIGS. 3A-3D are front, left side, right side, and bottom views of a keyed feeder port insert of an ergonomic bird feeder;

DETAILED DESCRIPTION

Figure 1:
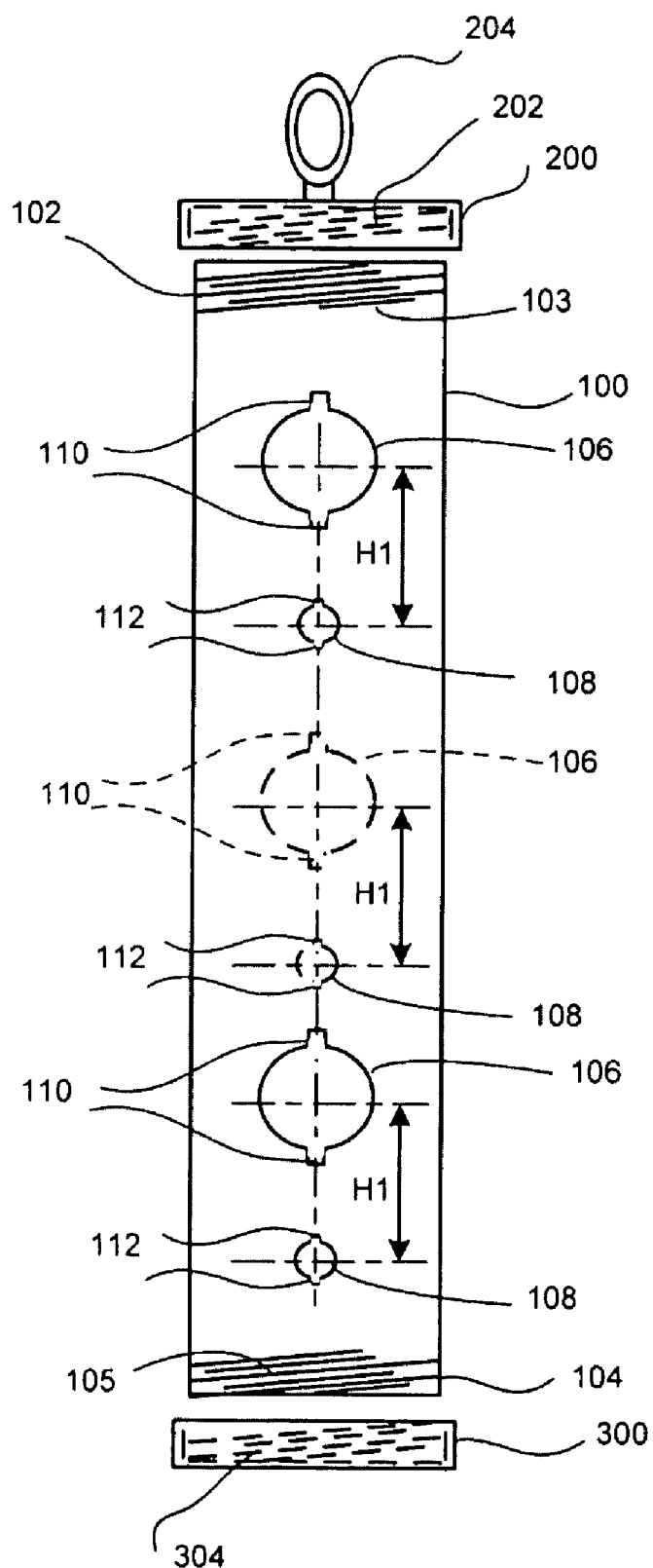
FIG. 1 is an exploded front view of a feeder cover cap, a hollow feeder tube and a feeder base of a first embodiment of an ergonomic bird feeder with three feeding stations.

The following description is merely exemplary in nature and is not intended to limit the present disclosure, its applications, or uses. It should be understood that throughout the drawings, corresponding reference numerals indicate like or corresponding parts and features.

Several embodiments of an ergonomic bird feeder are disclosed. As used herein, "ergonomic bird feeder" is defined as a bird feeder configured with at least one feeder station that is physically dimensioned to attract specific-sized birds or bird species to a feeder station. A "feeder station" is defined to include a feeder portal and perch portal pair. An ergonomic bird feeder can include multiple feeder stations and each feeder station can be uniquely configured to attract different physical size birds, thus facilitating access to feed within the feeder.

FIGS. 1-3D illustrate a basic set of five components of an ergonomic bird feeder assembly. FIG. 1 is a front view illustrating three of the five components of an ergonomic bird feeder: (1) a circular cover cap 202 with internal threads 202; (2) a hollow tube body 100 having a circumferentially keyed feeder portal 106 and a circumferentially keyed perch portal 108 for each feeder station with open top and open bottom ends 102,104 configured with externally threaded surfaces 103, 105; and (3) a circular base 300 with internal threads 304. The illustrated cover cap 200 has an elliptical-shaped loop-handle 204 configured for attaching to a hanging hardware element, such as an S-hook, for example. Cover cap 200 can also be used in some feeder assemblies as a base component if a user intends to vertically chain an assembly of feeders, as known to those skilled in the art. Alternative cover cap embodiments configured for engaging hanging hardware can be used, as known to those skilled in the art. For example, a cover cap configured with a U-shaped metallic wire loop that engages two opposing cover cap tabs, wherein the metallic wire loop pivots within the center of the tabs of the cover cap for hanging the feeder.

Tubular member 100 includes external threads 103, 105 at the top end 102 and bottom end 104, respectively, of the tube 100 for engaging the internal threads 202 of cover cap 200 and the internal threads 304 of base member 300, and retaining feed inserted into the tube. Cover cap 200 and circular base component 300 include internal threads 202, 304, respectively, that engage the external threads 103, 105, respectively, of feeder tube 100 to secure cover cap 200 and base 300 to feeder tube 100 when turned in a clockwise direction. As shown, the threads are right-handed threads that engage via clockwise rotation. In alternative embodiments, the threads can be configured as left-handed threads for engaging via a counter clockwise rotation. The illustrated embodiment is not intended to limit the threading configuration for an embodiment. In some embodiments, the circular base 300 with internal threads 304 can be positioned at the center of and integral to a concave-shaped saucer-like base that functions to retain seed dropped by birds accessing feed from a feeder portal 106. The bottom of such saucer-like base embodiment can be configured with finger-tip recesses for gripping the saucer-like base to facilitate rotating and securing the base to feeder tube 100. In an alternative saucer-like base structure embodiment, the circular base and its interfacing threads can be centered and recessed within the saucer base, as known to those skilled in the art. The disclosed circular base 300 is not intended to limit alternative circular threaded base structures for enclosing the open bottom end 104 of tube 100.

The cylindrical feeder tube 100 contains at least one circumferentially keyed circular feeder portal 106 for receiving a keyed feeder portal insert 500 (FIGS. 3A-3D) and one circumferentially keyed circular perch portal 108 for receiving a keyed perch portal insert 400 (FIGS. 2A-2E). Each feeder portal/perch portal pair defines a single feeder station of feeder tube 100. While the illustrated embodiment shows opposing rectangular key cut-outs 110 spaced 180 degrees apart along the circumference of the circular feeder portal 106 and opposing rectangular key cut-outs 112 spaced 180 degrees apart along the circumference of the circular perch portal 108, other key cut-out embodiments can be used. For example, circumferential key cut-outs can have shapes selected from the group of a partial circle, a partial ellipse, a trapezoid, a rectangle and a square. A circumferential key cut-out embodiment can be selected based upon the surface area required to secure its mating insert component to the walls of feeder tube 100.

FIGS. 2A-2E illustrate an embodiment of a fourth assembly component, a keyed perch portal insert 400 and FIGS. 3A-3D illustrate an embodiment of a fifth assembly component, a keyed feeder portal insert 500. As known to those skilled in the art, the key cut-out embodiments of the feeder tube must have similarly positioned mating key teeth 410, 510 on the perch portal insert 400 and feeder portal insert 500, respectively. In some embodiments, a plurality of key cut-outs may be used and the key cut-out can vary by feeder station. The illustrated rectangular key cut-out embodiment of FIG. 1 is not intended to limit alternative embodiments or alternative keying configurations.

In a first embodiment of the feeder tube shown in FIG. 1, the separation distance H1, between the center of a circular feeder portal 106 and the center of its paired circular perch portal 108, can be dimensioned to facilitate feeder station access for a specific size/species of bird(s), such as a Northern Cardinal, for example. A species-specific feeder can be stocked with food that attracts the species, such as sunflower seeds for the Northern Cardinal, for example. As illustrated, this separation dimension, H1, is the same for each feeder station and the illustrated embodiment includes a first feeder station positioned near the top and a third feeder station positioned near the bottom in the front of the tube and a second opposing feeder station positioned at the rear of the tube aligned between the first and third feeder stations in the front. The illustrated embodiment is not intended to limit the number of feeder stations in a given feeder tube configuration nor is the vertical alignment of the individual stations intended to limit the alignment and configuration of feeder stations in alternative embodiments. The illustrated embodiment shows the feeder stations in opposed positions, front and rear. Other feeder station configurations can be used, as known to those skilled in the art. For example, a feeder can be configured with four feeder stations with each feeder station positioned 90 degrees from its neighboring stations and each station vertically displaced from adjacent stations. As known to those skilled in the art, the number of feeding stations and their relative arrangement can vary depending upon the length of the tube and the ergonomic dimensioning of each feeder station.

Preferred feeder tube construction materials include recyclable plastic compositions and glasses. In some embodiment, a hollow feeder tube 100 may be constructed from glass and the feeder portal insert 500 and perch portal insert 400 constructed of a plastic material or a metal. More preferred feeder embodiments have hollow feeder tubes constructed from environmentally recyclable plastics and can thus be characterized as "green" feeders. Should a recyclable plastic feeder tube crack or break with use, it can simply be replaced and its interfacing assembly components reused.

FIGS. 2A-2E illustrate the top, left, right, front and rear views, respectively, of a cross-shaped perch portal insert 400 having a distal keying base with two distal key teeth 410 separated by a distance, Sd, from a circular proximal tooth 408 for insertion into a mating keyed perch portal 108. The proximal tooth 408 is circular in shape and overlaps the circumference of the circular perch portal 106 after engagement with the perch portal 108, engaging the outside surface of the tube 100. As illustrated, distal key teeth 410 are rectangular in shape and mate with the circumferential rectangular key cut-outs 112 at 180 degree opposing positions along the circumference of the perch portal 108. The separation distance, Sd, key element depth, W1, and dimension W2 are configured to enclose and engage the internal and external wall surfaces of the feeder tube 100 upon a 45-90 degree rotation of the cross-shaped perch portal insert 400. The angular position of a circumferential key cut-out along the circumference of a portal can vary depending upon the amount of rotation required to frictionally secure and engage perch portal insert 400 to feeder tube 100. The frictional engagement of each key tooth element with the internal and external wall surfaces of feeder tube 100 secures the perch portal insert 400 in a stable position subsequent to rotation. Due to the symmetrical structure of the cross-shaped perch portal insert 400, the securing rotation can be clockwise or counter clockwise. As illustrated, a 90 degree rotation horizontally aligns the perch portal insert with the feeder base.

While variable diameters D1, D2, D3 and D4 are illustrated for the horizontal and vertical elements of cross-shaped perch portal insert 400, in some embodiments, D1=D2=D3=D4 and the diameter is sized to ergonomically accommodate a bird's claw. Similarly, while the lengths L1, L2 of the vertical cross elements and lengths L3 and L4 of the horizontal cross elements are illustrated as variables, in some perch portal insert 400 embodiments, L2<L1, L3=L4 and L1 is dimensioned to ergonomically accommodate the distance from the center of a bird's feet to the center of a bird's beak when a bird is perpendicularly positioned to the feeder. Dimension W2 of the keyed cross base is configured to achieve the desired frictional engagement with the wall surfaces of feeder tube 100 and secure perch portal insert 400 to feeder tube 100 subsequent to rotation.

As shown, two key elements 410 are configured in opposing 180 degree positions and vertically aligned with the horizontal cross arms. In alternative perch portal insert embodiments, three key elements 410 can be positioned 120 degrees apart and mate with similarly configured perch portal cut-outs. The illustrated keying arrangement is not intended to limit alternative keying configuration embodiments, as known to those skilled in the art.

Alternatively, in some embodiments when the horizontal cross elements L3=L4=0, the cross-shaped perch becomes a keyed dowel-like perch. In some dowel-configured perch portal insert embodiments, the dowel can be tapered from its keyed base to its proximal end and can have recessed grooves to facilitate gripping and rotating the perch portal insert. The illustrated keyed cross-shaped perch is not intended to exclude alternative perch portal insert embodiments.

In some feeder embodiments, alternative dimensioned cross-shaped perch portal insert 400 components can be used, and the selection of an ergonomic perch portal insert 400 component can vary by feeder station position along the tube 100. By configuring each circular perch portal with the same dimension and key cut-out configuration, alternative perch portal inserts 400 can be interchangeable by feeder station. The cross-shaped perch portal insert 400 embodiment also functionally facilitates the rotational engagement of the perch portal insert 400 with tube 100 after insertion of the keyed distal end of the perch portal insert 400 into perch portal 106. Increasing the dimensions L3 and L4 increases the turning leverage of the perch portal insert 400. The cross-shaped perch portal insert also permits a bird to access feed when positioned either perpendicular to the tube or tangential to the tube. When a feeder station is configured with the perch portal horizontally offset from the feeder portal, feed can be more easily accessed when a bird is tangentially oriented to the tube.

FIGS. 3A-3D illustrate front, left, right and rear views of a keyed feeder portal insert 500 that engages with the circumferentially keyed circular feeder portal 106 of a feeder station. Feeder portal insert 500 has two opposing external wing-like tabs 502 that can function to provide compressive and rotational forces against the external wall surface of feeder tube 100 upon insertion of the feeder portal insert 500 into feeder portal 106. Wing-like tabs 502 function as finger-like grips to facilitate the rotation of the feeder portal insert 500, similar to a wing-nut, as known to those skilled in the art. Wing-like tabs 502 are contiguous with and perpendicular to annular ring 504. Annular ring 504 overlaps the outer circumference of circular feeder portal 106 when the keyed feeder portal insert 500 engages feeder portal 106. Annular ring 504 functions as a mechanical stop limiting the insertion distance of the feeder portal insert 500. A distal key tooth 510 of the feeder portal insert 500 is separated from the distal surface 506 of the annular ring 504 by a distance Sd, configured to frictionally engage the inner and outer wall surfaces of feeder tube 100 upon a rotation of about 90 degrees, securing the feeder portal insert 500 to feeder tube 100. Because of the symmetrical configuration of the feeder portal insert 500 keying elements 510, securing of feeder portal insert 500 to the feeder tube 100 can be achieved by either a clockwise or counter-clockwise rotation.

Similar to the keying configuration of the perch portal insert 400, the angular position of the keying cut-outs along the feeder portal circumference of the feeder portal can vary. The feeder portal insert has a hemispheric cavity 512 with the lower portion 514 of the hemisphere truncated (i.e., the "lower half" after rotation) to enable access to the feed within feeder tube 100. The outer surface 516 of the top half the hemispheric cavity functions to gravitationally direct feed toward the inner wall surface of the tube and provide "head-room" to access the feed, functioning as a "feeder portal umbrella", and preventing feed from dispensing through the feeder portal.

In an alternative embodiment, the annular ring 504 of the feeder portal insert 500 can be constructed of a flexible material composition having a convex shape. When inserted into the feeder portal 106, the distal convex surface of the annular ring can provide a compressive spring-like force perpendicular to the outside surface of the feeder tube 100, securing the feeder portal insert 500 to feeder tube 100. Such embodiment of the annular ring can provide a compressive seal with the outer surface of the feeder tube in addition to functioning as a stop, constraining the insertion distance of the feeder portal insert within the feeder tube. The disclosed washer-like shape of the annular ring of the feeder portal insert is not intended to limit alternative annular ring shape embodiments.

Figure 4:
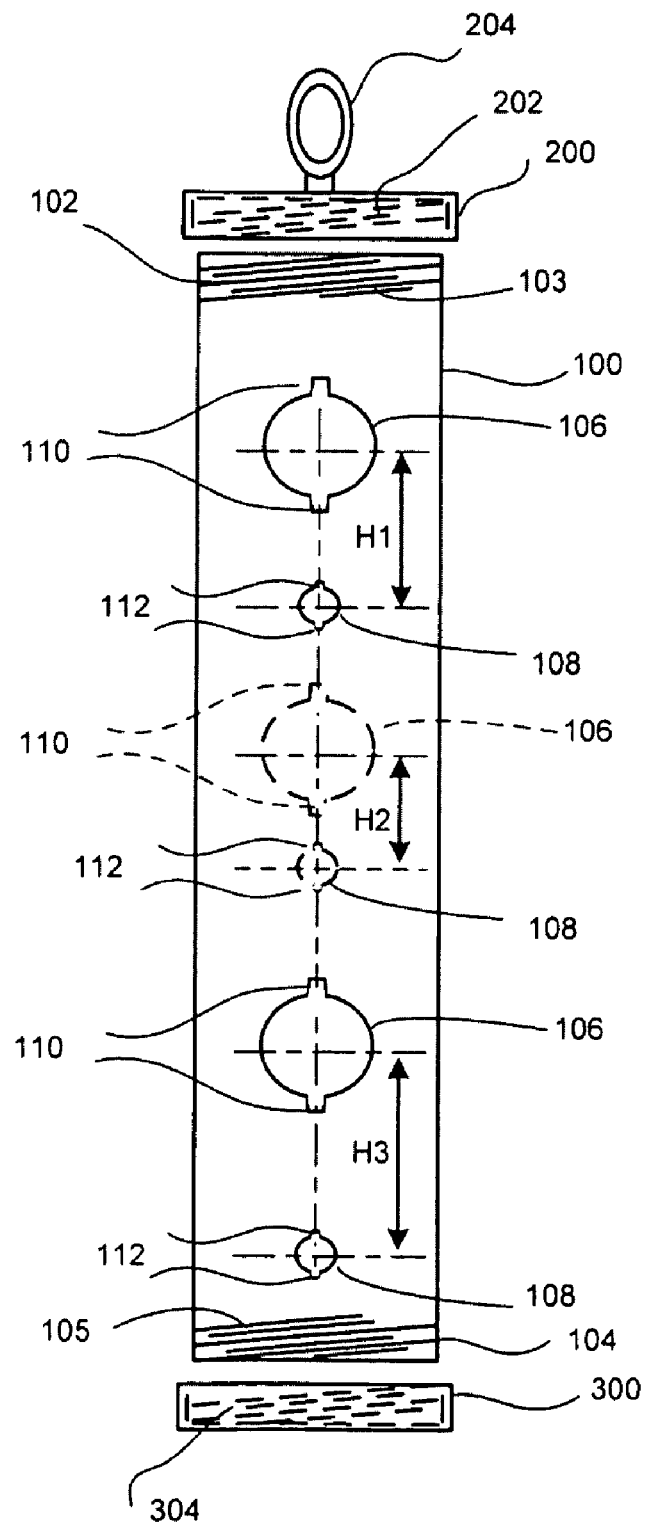
FIG. 4 is an exploded front view of a feeder cover cap, a hollow feeder tube and a feeder base of a second embodiment of an ergonomic bird feeder.

FIG. 4 illustrates a second embodiment of an ergonomic bird feeder. In this second embodiment the distances between the centers of the circular feeder portal 106 and circular perch portal 108 of each feeder station, H1, H2 and H3, are uniquely dimensioned (i.e., H1≠H2≠H3) to accommodate different physical sizes of birds accessing the feeder. Perch portal inserts 400 of this second embodiment can also be uniquely dimensioned to accommodate a given physical bird size. Perch portal inserts can also be a mix of cross-shaped perch portal inserts 400 and dowel-shaped perch portal inserts.

Figure 5:
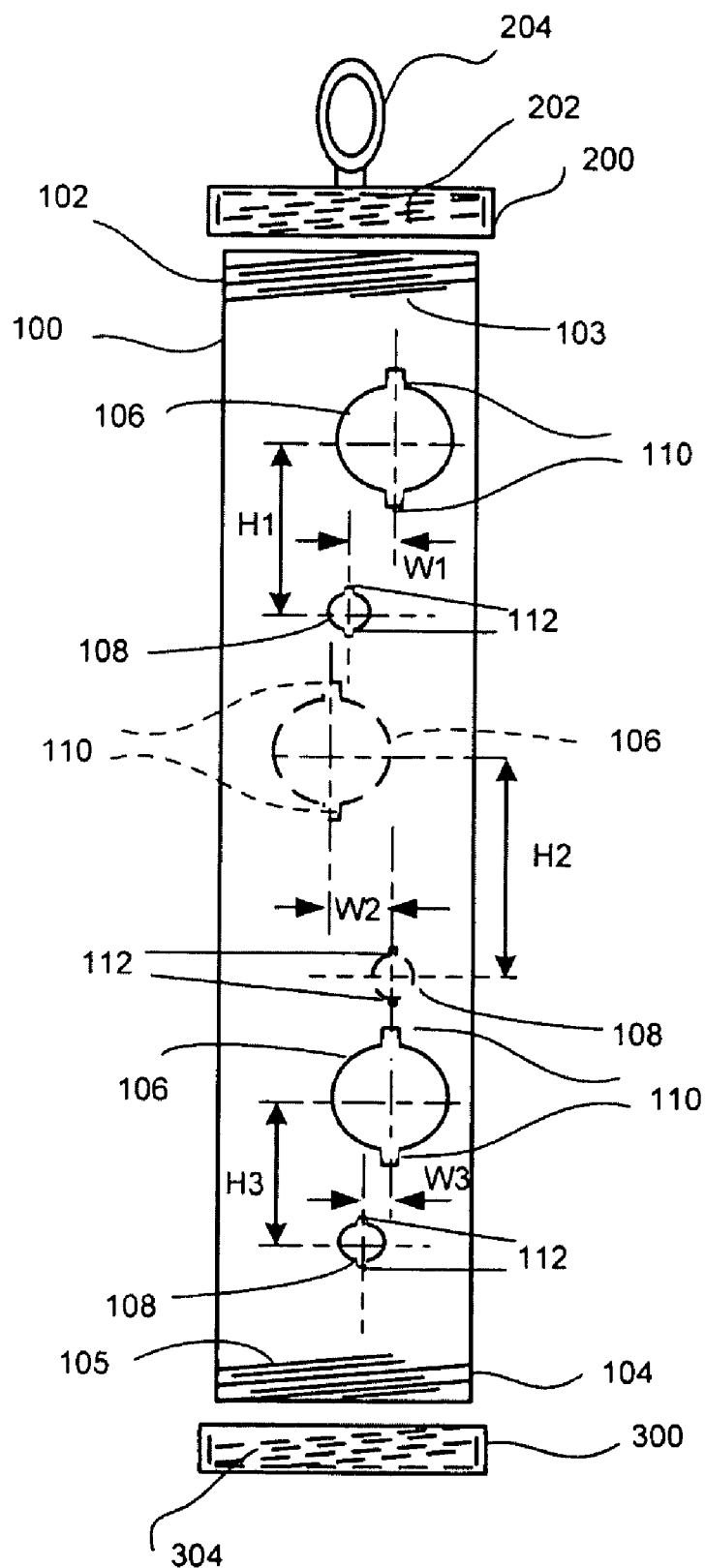
FIG. 5 is an exploded front view of a feeder cover cap, a hollow feeder tube and a feeder base of a third embodiment of an ergonomic bird feeder.

FIG. 5 illustrates a third embodiment of an ergonomic bird feeder. In this embodiment the vertical centerlines of the circular feeder portal 106 and the circular perch portal 108 are offset by distances W1, W2 and W3. In this embodiment, H1≠H2≠H3 and W1≠W2≠W3. This embodiment illustrates the feeder configuration flexibility provided with the individual feeder components using standard circular feeder portal 106 and circular perch portal 108 dimensions. A variety of ergonomic feeders can be configured using alternative perch portal inserts and standard feeder portal inserts with alternative ergonomically dimensioned feeder stations.

The disclosed ergonomic feeder components can be inserted and removed by hand without using tools and the components can be easily cleaned. Disassembled feeders are more easily stored when not in use and individual component parts can be replaced without having to replace an entire feeder assembly. Thus, an assembly kit of parts can be acquired and feeder tubes replaced, as needed.

A method of assembling an ergonomic bird feeder includes selecting a hollow feeder tube 100 having an open externally threaded top end 102 and an open externally threaded bottom end 104 configured with at least one ergonomically dimensioned feeder station, said feeder station comprising a circumferentially keyed circular feeder portal and a circumferentially keyed circular perch portal pair 106,108; engaging and securing an internally threaded circular base 300 to said feeder tube 100 by rotation of said base 300 relative to said feeder tube 100; inserting at least one keyed feeder portal insert 500 into a circumferentially keyed circular feeder portal 106 mate, frictionally engaging and securing said feeder portal insert 500 to said feeder tube 100 by rotation of said feeder portal insert 500 relative to said circular feeder portal 106; inserting at least one keyed perch portal insert 400 into its keyed circular perch portal 108 mate, frictionally engaging and securing said keyed perch portal insert 400 to said feeder tube 100 by rotation of said keyed perch portal insert 400 relative to said circular perch portal 108; inserting feed into feeder tube 100; and engaging internally threaded circular cover cap 200 to said feeder tube 100 by rotation of said feeder cover cap 200 relative to said feeder tube 100, securing said cover cap 200 to said feeder tube 100.

It can be seen that the various ergonomic bird feeder embodiments disclosed herein achieve the objectives of ease of assembly and disassembly without tools, ease of cleaning and can be constructed from recyclable materials. Those skilled in the art can now appreciate from this description that the broad teachings within disclosed embodiments can be implemented in a variety of forms, and other modifications will become apparent to the skilled practitioner upon a study of the drawings, specification, and following claims.

What is claimed is:

1. An ergonomic bird feeder configured with at least one feeder station, said feeder station comprising a circumferentially keyed circular feeder portal and a paired circumferentially keyed circular perch portal, the ergonomic bird feeder comprising:

an elongated hollow cylindrical feeder tube having an open top end with external threads and an open bottom end with external threads;

a circular cover cap with internal threads configured for rotationally engaging the external threads of said open top end and enclosing said open top end of said feeder tube, said cover cap configured for engaging hanging hardware;

a circular base with internal threads configured for rotationally engaging said external threads of said open bottom end and enclosing said bottom of said feeder tube;

at least one keyed feeder portal insert for inserting into and mating with said keyed feeder portal, frictionally engaging internal and external wall surfaces of said feeder tube upon rotation of said feeder portal insert relative to said feeder portal; and at least one keyed perch portal insert for inserting into and mating with said keyed perch portal, frictionally engaging internal and external wall surfaces of said feeder tube upon rotation of said perch portal insert relative to said perch portal.

2. The feeder of claim 1, wherein said feeder tube, said cover cap, said base, said feeder portal insert and said perch portal insert are constructed from recyclable materials.

3. The feeder of claim 1, wherein said cover cap is configured with a vertical loop for engaging hanging hardware.

4. The feeder of claim 1, wherein said base is configured with a vertical loop for engaging hanging hardware.

5. The feeder of claim 1, comprising a plurality of feeder stations, wherein each feeder station is ergonomically configured to include a substantially similar vertical dimension between a center of a circular feeder portal and a center of its paired circular perch portal.

6. The feeder of claim 5, wherein vertical centerlines of the circular feeder portal and circular perch portal of each feeder station are ergonomically configured with a horizontal offset.

7. The feeder of claim 1, comprising a plurality of feeder stations, wherein each feeder station of said feeder tube is ergonomically configured with different vertical dimensions between a center of a feeder portal and a center of its paired circular perch portal.

8. The feeder of claim 6, wherein vertical centerlines of a circular feeder portal and a circular perch portal of each feeder station are ergonomically configured with a horizontal offset.

9. The feeder of claim 1, wherein a circumferential key of a circular feeder portal is selected from the group consisting of a rectangle, a square, a partial circle, a partial ellipse and a trapezoid.

10. The feeder of claim 1, wherein a circumferential key of a circular perch portal is selected from the group consisting of a rectangle, a square, a partial circle, a partial ellipse and a trapezoid.

11. The feeder of claim 1, wherein said feeder portal insert is configured as a truncated hemispheric cavity with distal key teeth and a proximal annular ring with opposing wing-like tabs, wherein the distance between said key teeth and said annular ring is configured to frictionally engage inner and outer wall surfaces, respectively, of said feeder tube upon rotation of said feeder portal insert relative to said feeder portal.

12. The feeder of claim 11, wherein said distal key teeth of said feeder portal insert are selected from the group consisting of a rectangle, a square, a partial circle, a partial ellipse and a trapezoid.

13. The feeder of claim 1, wherein said perch portal insert is configured with distal key teeth and a circular proximal tooth and the distance between said distal key teeth and said circular proximal tooth is dimensioned to frictionally engage the inner and outer wall surfaces, respectively, of said feeder tube upon rotation of said perch portal insert relative to said perch portal.

14. The feeder of claim 13, wherein said distal key teeth of said perch portal insert are selected from the group consisting of a rectangle, a square, a partial circle, a partial ellipse and a trapezoid.

15. The feeder of claim 13, wherein said perch portal insert is cross-shaped and ergonomically dimensioned to facilitate access to feed within the feeder tube.

16. The feeder of claim 13, wherein said perch portal insert is dowel-shaped and ergonomically dimensioned to facilitate access to the feed within the feeder tube.

17. A method of assembling an ergonomic bird feeder comprising:

selecting a hollow feeder tube having an externally threaded open top end and an externally threaded open bottom end, configured with at least one ergonomically dimensioned feeder station, said feeder station comprising a circumferentially keyed circular feeder portal and a circumferentially keyed circular perch portal pair;

engaging and securing an internally threaded circular base to said externally threaded open bottom end of said feeder tube by rotation of said base relative to said feeder tube;

inserting at least one keyed feeder portal insert into a circumferentially keyed circular feeder portal mate, and frictionally engaging and securing said feeder portal insert to said feeder tube by rotation of said feeder portal insert relative to said feeder portal;

inserting at least one keyed perch portal insert into a circumferentially keyed perch portal mate, and frictionally engaging and securing said keyed perch portal insert to said feeder tube by rotation of said keyed perch portal insert relative to said perch portal;

inserting feed into said feeder tube; and engaging and securing an internally threaded circular cover cap to said externally threaded open top end by rotation of said cover cap relative to said feeder tube.

* * * * *